March 26, 1946.  R. R. WHITING  2,397,176
STRAINER
Filed May 9, 1944
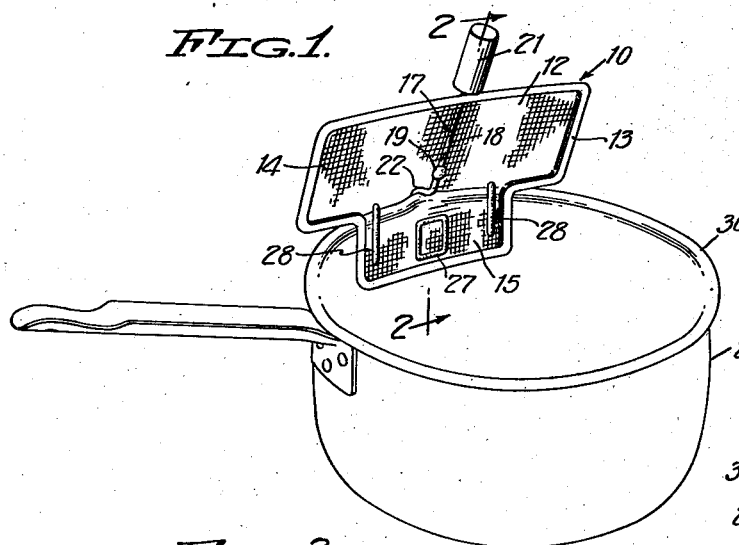
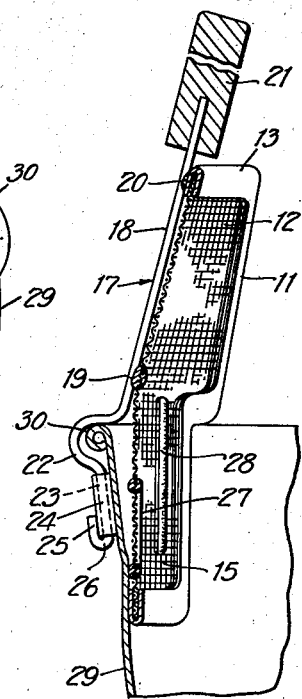
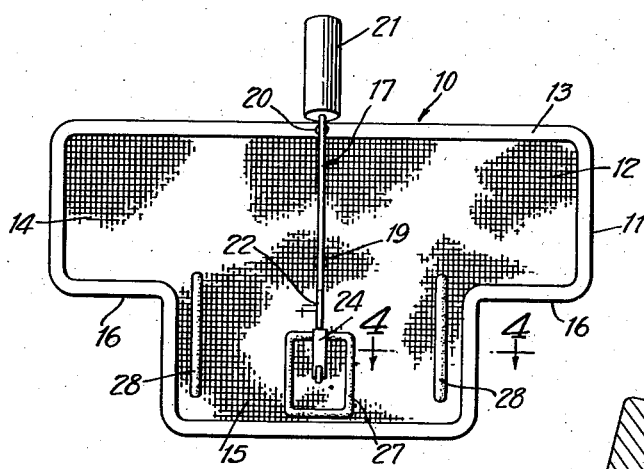
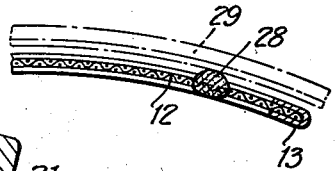
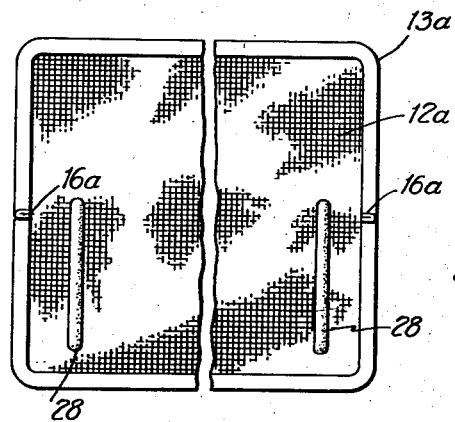
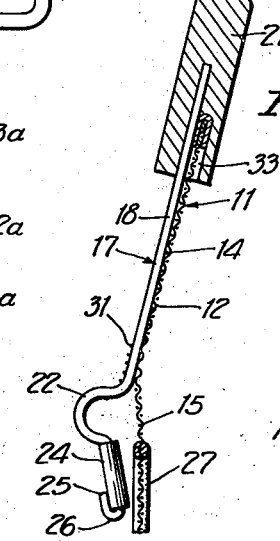
INVENTOR
ROBERT R. WHITING.
BY
ATTORNEY Patented Mar. 26, 1946

2,397,176

UNITED STATES PATENT OFFICE 2,397,176

STRAINER

Robert R. Whiting, Delray Beach, Fla.

Application May 9, 1944, Serial No. 534,735

12 Claims. (Cl. 210—163.5)

This invention relates to new and useful improvements in strainers, and this application constitutes a continuation-in-part application of my prior application, Serial No. 486,631, filed May 12, 1943.

The primary object of my invention resides in a strainer which may be attached to the edge of a cooking vessel at will for use in straining the liquid contents of the vessel from the solids thereof during a pouring operation and which may be readily removed from the vessel after each use thereof.

Another object of the invention is to provide a strainer which constitutes a kitchen accessory for use upon various sized cooking vessels which are usually found in a household kitchen. Thus the presence of a single strainer in a household kitchen will suffice for use upon the various sizes and shapes of cooking vessels present therein.

Another object of the invention is the provision of a strainer in which the clamping surfaces thereof are formed of resilient rubber so as to increase the friction clamping action between the strainer and a cooking vessel, and to also prevent scratching of the surfaces of the vessel during its sliding attachment and removal therefrom.

Other objects of the invention are to provide a strainer for cooking vessels which is simple and inexpensive of construction; strong and durable to withstand the strains and stresses to which it is subjected during use; and which may be thoroughly cleansed after each use to maintain the strainer in a sanitary condition.

Other novel features of the invention will become apparent as the following specification is read in conjunction with the accompanying drawing, in which, Figure 1 is a perspective view of my improved strainer in position of use upon a sauce pan.

Figure 2 is an enlarged detail vertical sectional view on the line 2—2 of Figure 1.

Figure 3 is a view in side elevation looking in the direction of the outer side of the strainer per se.

Figure 4 is an enlarged detail horizontal sectional view on the line 4—4 of Figure 3, but showing the strainer body flexed to the shape of the side wall of the sauce pan, the latter being shown in dot and dash lines.

Figure 5 is a fragmentary perspective view illustrating a modified embodiment of my invention.

Figure 6 is a detail vertical sectional view through a modified form of connection between the handle and screen body of the strainer.

Referring to the drawing by reference characters, and at present to the form of my invention illustrated in Figures 1 to 4 inclusive, the numeral 10 designates a strainer in its entirety constructed in accordance with my invention. The strainer 10 includes a flexible strainer body 11 which is substantially T-shaped in side elevation. The strainer body 11 is preferably constructed of flexible wire screening 12, the edges of which are bound by flexible metal channel binding 13. If desired, the screening may be provided with a woven or selvage edge during its manufacture. Except for the danger of the ends of the wires of the screening scratching one's hands during use, the binding 13 could be omitted. The T-shaped body 11 comprises an upper head portion 14 and a depending tail portion 15. The oppositely extending ends of the head portion may be termed wings and define shoulders 16—16, the purpose of which will be hereinafter fully explained. The head and tail portions 14 and 15 are bent inwardly relative to each other to cause the head portion 14 to resist the pressure of the weight of the liquid passing therethrough during use of the strainer.

Carried by the head portion 14 of the body 11 midway of the width thereof is a metal wire member 17. The wire member 17 includes a straight shank portion 18 which is disposed substantially parallel to the head portion 14 and to which it is fixedly connected by solder connections 19 and 20. The solder connection 19 is made between the lower end of the shank portion 18 and the wire screen 12, while the solder connection 20 is made between the upper end of the shank portion 18 and the metal binding 13. The upper end of the shank portion 18 extends above the top edge of the strainer body and has a wooden handle 21 fixedly secured thereto. The handle 21 may be made of other material than wood, but preferably of a material having low heat absorbing characteristics, so as not to heat up to an extent which would be too hot to the touch of the fingers of a user. Below the shank portion 18, the wire member 17 is formed with an outwardly offset loop portion 22, below which is formed a straight clamping jaw portion 23 which extends inwardly at an angle relative to the shank portion 18. The jaw portion 23 overlaps the tail portion 15 of the strainer body and is enclosed in a rubber sleeve 24. The lower terminal end of the wire member 17 is bent outwardly upon itself as at 25 to provide a rounded end portion 26 and to prevent the sleeve from sliding downwardly upon the jaw portion 23. By reason of the loop 22, the clamping jaw 23 is made sufficiently resilient so as to move outwardly away from the strainer body during the attachment of the strainer 10 to a cooking vessel and its removal therefrom.

The mid portion of tail portion 15 of the strainer body cooperates with the jaw 23 to secure the strainer in a rigid position upon a cooking vessel, and that portion of the tail portion in opposed relation to the jaw is provided with a rectangular rubber frame 27. The rubber frame may be formed by moulding the same to the screening or may be formed by lacing strands of rubber through the openings in the wire screen. The rubber frame 27 is of such thickness that the outer side thereof projects beyond the plane of the outer side of the edge binding 13. The outer side of the rubber frame 27 cooperates with the rubber covered jaw 23 to form a clamp by which the strainer is secured in position upon a cooking vessel for use.

The tail portion 15 is further provided with a pair of spaced vertical rubber cushion grip elements 28—28. The elements 28—28 are respectively disposed adjacent the ends of the tail portion and have their outer surfaces projecting beyond the plane of the outer surfaces of the adjacent binding 13.

In Figures 1 and 2 I have illustrated the strainer 10 in position for use upon a sauce pan 29 of the kind having an outwardly rolled bead 30. The sauce pan 29 is shown as having a pouring lip 31 but this is optional for the strainer 10 may be applied to either type. To apply the strainer in position over the top edge of the sauce pan 29, the handle 21 is grasped and the depending tail portion 15 is inserted into the sauce pan along the side wall thereof. As the tail portion 15 slides down the side wall, the rounded end 26 of the wire member 17 engages the beaded edge of the pan and rides outwardly thereover causing an outward flexing of the jaw portion 23, which also passes over the beaded edge and as it clears the edge, it snaps inwardly to cause the rubber sleeve 24 to flatly engage the outer surface of the sauce pan. Downward sliding movement of the strainer over the edge of the pan is limited by engagement of the offset loop 22 with the top edge thereof and by reason of the shoulders 16—16 with said top edge. As the tail portion 15 is inserted into the pan it becomes flexed in an end to end direction so as to substantially conform to the curvature of the side wall against which it fits whereby the rubber grip elements 28—28 and rubber frame 27 coact with the rubber sleeve 24 to firmly clamp the strainer in position. The rubber gripping elements also prevent the strainer body from scratching the surfaces of the pan which they engage during the sliding of the strainer onto and off the side wall of the pan. The shoulders 16—16 also, by their engagement with the top edge of the pan, prevent rocking and wabbling of the strainer when the pan is tilted to pour liquid therefrom, through the mesh screen of the strainer body.

After each use of the strainer 10 upon a pot or pan, the same may be withdrawn by grasping the handle 21 and pulling upwardly thereon, whereupon it may be washed separate from the pan and kept in a clean sanitary condition for future use upon the same pan or upon any other open pot or pan which may constitute the cooking vessels of a home kitchen.

In Figure 5 of the drawing, I have illustrated a modified form of my invention wherein the screen body 12a of the strainer is rectangular in shape instead of T-shape as heretofore shown and described. In lieu of the shoulders 16—16, I form projections or shoulders 16a—16a by crimping portions of the metal binding 13a outwardly therefrom. The shoulders 16a—16a perform the same function as the shoulders 16—16 formed by the T-shape of the strainer body 11.

In Figure 6 of the drawing, a further modification of handle connection is illustrated. In lieu of soldering the wire member 17 to the strainer body 11, I interlace the shank portion 18 thereof through several of the meshes of the screening 12 as at 31 and push the member 17 upwardly through these meshes until the loop portion 22 prevents the member 17 from further upward movement in the direction of the top edge of the strainer body. The handle 21a having a slot 33 may now be forced down onto the upper end of the shank portion 18 until the top reenforced marginal edge of the strainer body engages against the end wall of the slot 33. It will thus be understood that the wire member 17 cannot slide upward relative to the strainer body because the loop portion 22 prevents such movement. Also, the wire member 17 is prevented from sliding downwardly relative to the strainer body because the handle 21a is wedged to or secured to the upper end of the shank portion 18 of the wire member with the top reenforced edge of strainer body engaging the end wall of the slot 33. By reason of the snug fit between the top reenforced or selvage edge of the strainer body and the walls of the slot 33, the wire is prevented from wabbling in a front to rear direction. Further, the walls of the slot 33 cooperate with the upper portion of the strainer body for preventing the accidental turning of the handle 21a on the axis of the shank portion 18 of the wire member 17.

While I have shown and described what I consider to be the most practical embodiments of my invention, I wish it to be understood that such changes in material, construction and design as come within the scope of the appended claims may be resorted to if desired without departing from the spirit of the invention.

Having thus described the invention, what I claim as new and desire to secure by Letters Patent of the United States is:

1. A detachable strainer for attachment to the edge of a cooking vessel comprising a normally substantially flat flexible strainer body adapted to have its lower portion inserted downwardly within a cooking vessel along the inner wall thereof for flexing to a position in conformation therewith, a resilient clamping jaw carried by said strainer body a substantial distance below the top edge thereof and substantially midway between the opposed side ends thereof and disposed in confronting relation to the outer side of the lower portion of said strainer body for cooperation therewith to clamp the strainer in position upon the side wall of a cooking vessel so that a portion of the strainer body extends beyond the top edge of the vessel, and a handle carried by said strainer body and extending upwardly beyond the top edge thereof.

2. A detachable strainer as set forth in claim 1 including shoulders provided at the side ends of the strainer body for seating upon the top edge of a cooking vessel when the strainer is in attached position thereon for limiting the downward insertion of the strainer into the vessel and for preventing side end to end wabbling of the strainer relative to the vessel when in use.

3. A detachable strainer as set forth in claim 1 including resilient friction gripping elements provided on the clamping jaw and on the adjacent lower portion of the strainer body for tight gripping engagement with the outer and inner surfaces of the side wall of a cooking vessel.

4. A detachable strainer for attachment to a receptacle comprising a flexible T-shaped strainer body having an upper cross head portion and a lower tail portion, the tail portion adapted to be flexed and inserted downwardly along the inner side wall of a receptacle in conformation thereto with the cross head portion extending above the top edge thereof, a resilient clamping jaw carried by said strainer body midway between the opposed side ends thereof and disposed in confronting relation to the outer side of the tail portion for clamping cooperation therewith to clamp the strainer in position upon the side wall of a receptacle, and a handle carried by said strainer body and extending upwardly beyond the top edge thereof.

5. A detachable strainer as set forth in claim 4 in which the lower edges of the opposed side end portions of the head portion of the strainer body constitute shoulders for seating upon the top edge of a receptacle when in use thereon for preventing side end to end wabbling of the strainer.

6. A detachable strainer as set forth in claim 4 in which the head portion and the tail portion are disposed at an angle relative to each other so that the head portion tilts inwardly of the receptacle on a horizontal line across the top edge of the side wall thereof when the strainer is in position of use thereon.

7. A detachable strainer as set forth in claim 4 including resilient gripping elements provided on the clamping jaw and on the adjacent tail portion of the strainer body for tight frictional engagement with the respective outer and inner surfaces of the side wall of a receptable.

8. A detachable strainer for cooking vessels comprising a body portion of flexible wire mesh adapted to be flexed into conformation to the inner contour of the side wall of a cooking vessel, means cooperating with the strainer body for securing it in operative position upon the side wall of a cooking vessel, said means comprising a single spring wire having its intermediate portion interlaced with the wire mesh of the strainer body and extending vertically across a portion thereof and having its upper end extending beyond the top edge of the body portion, and a handle secured to the upper extending end of the wire member.

9. A detachable strainer for receptacles comprising a strainer body of flexible material adapted to conform itself to the inner contour of the side wall of a receptacle, a resilient wire member having an outwardly offset shoulder adjacent the lower end thereof dividing the wire member into an upper portion and a lower portion, said wire member extending vertically across the strainer body midway between its opposed side ends with its upper end portion projecting above the top edge of the strainer body and with the off-set shoulder disposed in confronting relation to the strainer body, solder means securing the upper portion of the wire member to said strainer body, and a handle member fixedly secured to the upper projecting end of the wire member, said offset portion adapted to engage the top edge of the side wall of a receptacle to limit the downward movement of the strainer when inserted over the edge thereof to a position of use.

10. A detachable strainer as set forth in claim 9 including means at the opposed side ends of the strainer body for seating engagement upon the top edge of a receptacle to prevent side end to end wabbling of the strainer when in position of use.

11. A detachable strainer for receptacles comprising a strainer body of flexible material adapted to conform itself to the inner contour of the side wall of a receptacle, an operating handle carried by the top edge of the strainer body, a resilient wire member carried by the handle and extending downwardly across a portion of the strainer body for cooperation therewith to retain the strainer in operative position upon a receptacle, an offset shoulder formed in the resilient wire member for engagement with the top edge of a receptacle to limit the movement of the strainer body in a direction inwardly of a receptacle on a horizontal line across the top edge thereof, and means for preventing side end to end rocking movement of the strainer body when in operative position upon a receptacle, said last-mentioned means comprising projections extending from the strainer body for engagement with the upper edge of a receptacle.

12. A detachable strainer for receptacles comprising a strainer body of flexible material adapted to conform itself to the inner contour of the side wall of a receptacle, an operating handle carried by the top edge of the strainer body, a resilient wire member carried by the handle and extending downwardly across a portion of the strainer body for cooperation therewith to retain the strainer in operative position upon a receptacle, an offset shoulder formed in the resilient wire member for engagement with the top edge of a receptacle to limit the movement of the strainer body in a direction inwardly of a receptacle on a horizontal line across the top edge thereof, means for preventing rotary movement of the handle and the resilient wire member relative to the strainer body and also for limiting sliding movement of the handle and resilient wire member in a downwardly direction relative to the strainer body, means for limiting sliding movement of the handle member and resilient wire member in an upward direction relative to the strainer body, and means for preventing side end to end rocking movement of the strainer body when in operative position upon a receptacle.

ROBERT R. WHITING.